April 16, 1935.  E. R. FROST  1,998,363
METHOD OF HEATING OBJECTS ELECTRICALLY
Filed Nov. 10, 1930  2 Sheets-Sheet 1
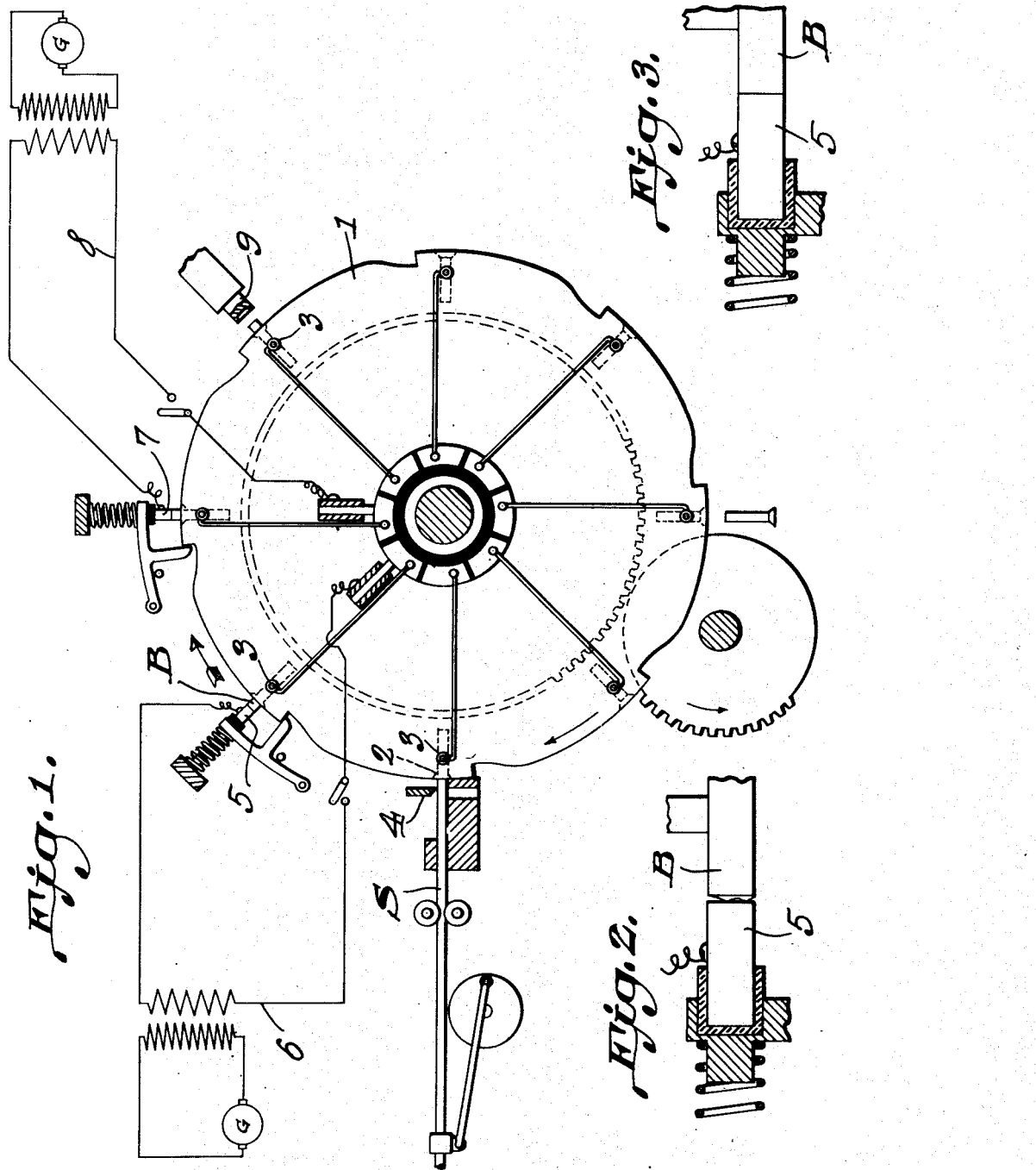
E. R. Frost Inventor
By C. A. Snow & Co.
Attorneys

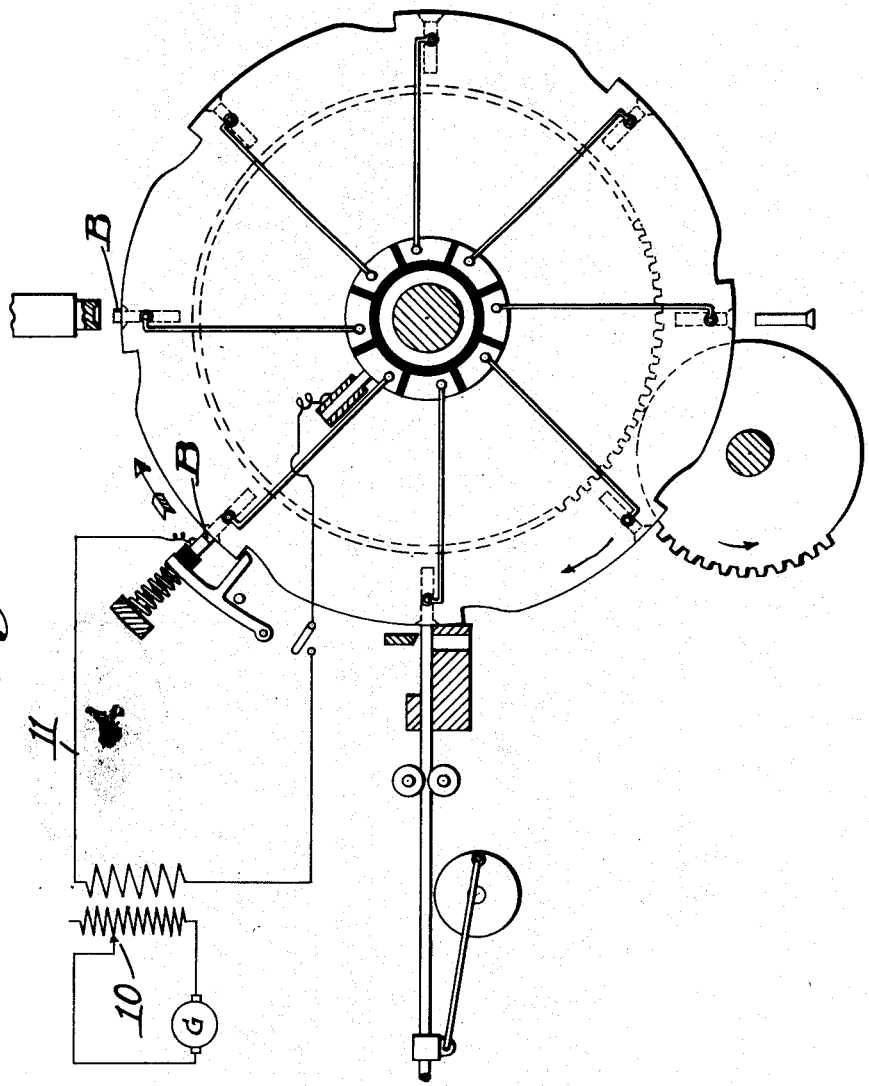

Patented Apr. 16, 1935

1,998,363

UNITED STATES PATENT OFFICE 1,998,363

METHOD OF HEATING OBJECTS ELECTRICALLY

Earl R. Frost, Tiffin, Ohio, assignor to The National Machinery Company, Tiffin, Ohio Application November 10, 1930, Serial No. 494,749

6 Claims. (Cl. 219—3)

This invention relates to a method of heating objects electrically and is more especially an improvement on those machines wherein the objects to be heated are subjected to the action of electrical heating electrodes prior to being shaped between dies provided therefor or prior to other operations dependent on heat treatment of a portion of the object being handled.

It has been found in practice that many objects, such as blanks severed from bar stock, are formed with rough or irregular ends, and when one of these ends is brought against a heating electrode carrying sufficient current properly to heat or soften the material, said end will make a poor contact and will become burned, thereby seriously affecting the work.

It is an object of the present invention to avoid the objectionable features present in old methods by subjecting the object under treatment to an initial heat sufficient merely to soften the rough irregular end thereof so that, by pressure, said end can be flattened out to make a smooth, intimate contact with its heating electrode after which a further heating current of greater strength can be directed into the work to bring it to the desired working heat over a predetermined area, and without danger of injuring the end of the work by burning.

With the foregoing and other objects in view which will appear as the description proceeds, the invention resides in certain novel steps in the method hereinafter pointed out, it being understood that changes in the scope of the invention may be made without departing from the spirit thereof.

In carrying out the invention the metal article to be treated is conveyed to an electrode of an electrical heating mechanism against which it is pressed by suitable means provided for that purpose. The article is connected to one terminal of an electric circuit so that when it is brought against the heating electrode, the contacted end of the work will be heated to a temperature sufficient to soften the end portion only of the work.

Thus should there be a poor contact due to an uneven cut, or protuberances of any kind, the surface of the work would be flattened out by pressing the article against the electrode. The current used at this time is not strong enough to burn the article.

Thereafter, while intimate contact is being made between the previously flattened work and a heating electrode, a current of increased strength is directed into the article sufficiently to bring a desired area of the work to a predetermined heat, after which the article can be shaped by any suitable means or otherwise treated under heat.

The method can include the steps of initially treating the work with a heating current sufficient only to soften the end of the article, then flattening the end by pressure, and subsequently transferring the object to another point where it can be subjected to a greater heating current sufficient to soften the article to a workable state. If desired, however, the article after the initial heating and flattening operation, can be subjected to a greater heat through the same electrode and without moving the article to a second position. This operation can be effected by the use of suitable means for controlling the current to the electrode either automatically or otherwise.

In the accompanying drawings there have been shown in diagram means whereby an object can be treated by the method disclosed.

Figure 1 is a diagram of an apparatus for subjecting a blank to different heats successively at separate stations respectively.

Figure 2 is a detail view showing the rough end of a blank engaged with a heating electrode prior to being flattened.

Figure 3 is a similar view showing the work flattened out following the initial heat treatment.

Figure 4 is a view similar to Figure 1 illustrating in diagram an apparatus for subjecting the work to different temperatures at one station thereby to initially heat and flatten the work and subsequently raise the temperature of the article to a working heat.

In Figure 1 a rotatable carrier has been indicated at 1 and has die recesses 2 into which extend electrodes 3 insulated from the carrier. Blanks B can be cut off by suitable shearing mechanism 4 from a bar of stock S and directed successively into the recesses or can otherwise be produced and placed.

A yieldingly pressed heating electrode 5 is located where it can intermittently engage and bear against blanks B as they are fed thereto by the carrier and this electrode is electrically connected to a transformer circuit 6 which is adapted to be closed by the blank when engaged by the two electrodes. The heating current at this station is only sufficient to soften the end of the blank B so that it will flatten out from an irregular shape as shown, for example, in Figure 2, to a smooth snug contact with the electrode as in Figure 3.

From this station the blank is conveyed to a second position where it is engaged by another electrode 7 included in a transformer circuit 8. This circuit is adapted to be closed by the blank B and to supply to the blank a heating current of sufficient strength to bring the blank to a working heat. Thereafter the blank is conducted to the shaping mechanism indicated generally at 9.

In Figure 4 has been shown in diagram a modified form of mechanism in which both heat treatments are given at one station. By the use of suitable means 10 for controlling the current in the heating circuit 11 the blank B can be subjected to the initial heating and flattening operation following which the heat can be increased at the same station to bring the article to working condition.

Although the method disclosed herein shows the article adapted to be subjected to two stages of heat only, it is to be understood that any desired number of heating stages can be employed to build the article up to the proper working heat.

What is claimed is:

1. The method of preparing for heat treatment an object having a rough surface which consists in positioning the object with said surface in contact with an electrode of an electric heating circuit, directing into said object from the engaged electrode a current for producing less than a forging temperature but sufficient to soften the engaged rough portion of the object without burning it, then flattening the object by pressure against the electrode to make an intimate contact therewith at one end of sufficient capacity to carry, without burning, a current sufficient to bring the object to a working heat and finally directing said current into the blank through said end.

2. The method of heat treating an article having a rough end to place it in condition for shaping under pressure which includes the steps of feeding the article to a heating circuit to close the circuit and heat said rough end of the article to less than forging temperature thereby to soften said end without burning, subsequently flattening said softened end by pressure of an electrode thereagainst thereby to effect a contact of such size as to carry an increased current sufficient to bring the object to a working heat, and thereafter supplying said increased current to the blank through the engaged electrode.

3. The method of preparing for shaping while hot, an object having an end with rough protuberances which includes the steps of placing the object in an electrical heating circuit to close the circuit and heat the protuberances on said end to less than the forging temperature required by the article but sufficient to soften said protuberances without burning, then subjecting the object to pressure to flatten said softened portions and produce an electrical contact of increased capacity and finally supplying increased heating current to said end to bring the object to a temperature for working.

4. The method of preparing for shaping while hot, an object having an end with rough protuberances which consists in directing the work into contact with electrodes of an electrical heating circuit thereby to close the circuit, said protruding portions bearing against one electrode, directing into the electrode a current sufficient to soften the protruding portions but at a heat less than that required to bring the article to a forging temperature, then pressing the softened end of the work against the electrode to make an electrical contact therewith of increased capacity thereby to permit the flow of an increased heating current into the work without burning it, and finally directing increased current into the work through said end to raise the heat of the work to forging temperature.

5. The method of heat treating an article having a rough end which includes the step of positioning the article between electrodes with its rough end in contact with one electrode, supplying to the article through the electrodes a current sufficient to soften the rough portions of said end without arcing or burning but insufficient to soften the remainder of the article, flattening said softened portion against said electrode to eliminate gaps therebetween and effect an intimate contact between the electrode and all portions of said end, and thereafter subjecting the article to a current of full strength to soften the article.

6. The method of preparing for shaping while hot, an object having an end with rough protuberances which consists in directing the work into contact with electrodes of an electrical heating circuit thereby to close the circuit, said protruding portions bearing against one electrode and forming gaps, directing into the electrode a current only sufficient to soften the protruding portions and at a heat less than that required to bring the article to a forging temperature, then yieldingly pressing the softened protuberances of the work against the electrode with sufficient force to flatten the protuberances and obliterate the gaps, thereby producing an electrical contact with the work of increased capacity so as to permit the flow of an increased heating current into the work without burning it, and finally directing increased current into the work through said end to raise the heat of the work to forging temperature.

EARL R. FROST.